Oct. 12, 1954    B. F. SMITH    2,691,558
PUMP PACKING
Filed Aug. 4, 1949

*INVENTOR.*
BARCLAY F. SMITH
BY
ATTORNEY

Patented Oct. 12, 1954

2,691,558

UNITED STATES PATENT OFFICE 2,691,558

PUMP PACKING

Barclay F. Smith, Overland, Mo., assignor to Carter Carburetor Corporation, St. Louis, Mo., a corporation of Delaware Application August 4, 1949, Serial No. 108,464

1 Claim. (Cl. 309—4)

1

This invention relates to fluid pumps of reciprocating piston type, and has particular reference to a novel and effective provision in the piston structure for sealing the piston rod against fluid leakage along the rod in the zone of its connection to the body of the piston.

The invention is concerned in particular, although not exclusively, with a reciprocating piston pump of relatively small size suitable for embodiment in a carburetor to supply acceleration fuel, wherein the piston structure includes a piston body, an operating rod and a packing cup for sealing engagement with the pump cylinder. A co-pending application of Barclay Smith, Serial No. 2,232, filed January 14, 1948, and now abandoned, suggests the formation of the packing cup of resilient, flexible material such as synthetic rubber, with its base portion clamped between the piston body and a broad backing washer. Substantially the entire base portion or disc of the packing is under compression in its clamped position and since synthetic rubber tends to flow under pressure, it is found that even though the packing cup disc in the structure indicated, is compressed only slightly, the disc ultimately becomes permanently distorted. Leakage around the piston rod may result if the fit is not tight enough. If the cup fits the stem tightly, the rubber "flows" and takes a permanently distorted set. The increased diameter of the cup disc causes excessive curving of the cup flange and leakage results around the cup.

It is the general purpose of the present invention therefore, to provide in avoidance of the above stated ineffective seal condition, a piston assembly of the character hereinabove indicated, in which is embodied novel means in relation to the aperture-defining margin of the packing cup disc, for assuring an effective sealing contact of the disc margin with the piston rod. In the present exemplary disclosure, such means comprise a rib or projection so disposed on either the packing cup disc or the piston body, as to effect in piston assembly, an appreciable axial compression of the marginal portion only of the cup disc defining the rod aperture therein. The remainder of the cup disc in the presently improved structure is retained between the piston body and the rod-supported backing plate under practically no axial compression. Consequently, since disc compression is thus restricted to the marginal region of the rod aperture, any pressure-flow which may occur is limited to such restricted portion of the cup disc and when occurring, appears only in relatively small extent insufficient

2 to affect adversely, an effective seal at the rod.

The foregoing general object and other more specific objects and advantages of the present invention will appear from the following description of presently preferred embodiments illustrated in the accompanying drawing, wherein.

Figure 1:
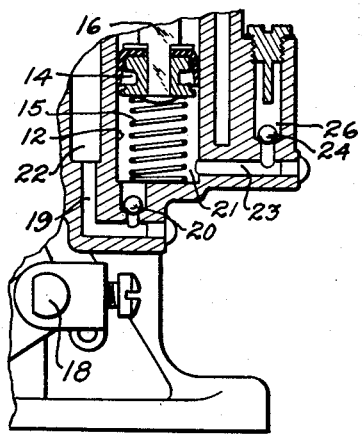
Fig. 1 illustrates a carburetor in fragmentary part, with the portion thereof embodying the presently improved pump piston, shown in section.

Fig. 1 shows the accelerating pump portion of an automotive carburetor including a cylinder 12 and a piston assembly 14 working therein. A coiled spring 15 is compressed between the piston and the bottom of the cylinder. The pressure or delivery stroke of the piston is effected by means of operating linkage (not shown) between the throttle shaft 18 and the rod or stem 16 of the pump piston. Inlet passage 19, controlled by inlet check 20, connects the pump pressure chamber 21 with the fuel reservoir 22. The pump is discharged through a passage 23, past ball check valve 24, into passage 26, from whence the fuel is delivered for discharge at a suitable point or points in the engine fueling system, as for example, in the carburetor mixture passage.

Figure 2:
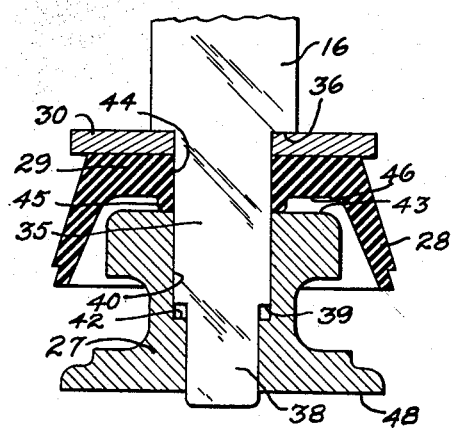
Fig. 2 is an enlarged sectional view longitudinally through a piston structure and showing the packing unclamped.
Figure 3:
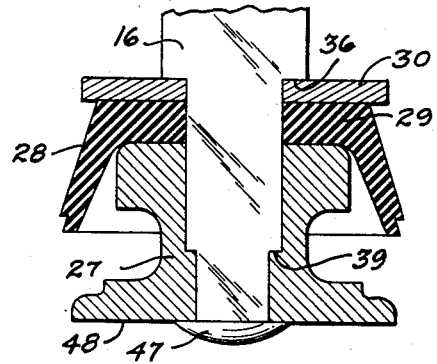
Fig. 3 is a sectional view similar to the view of Fig. 2, but showing the assembled condition of the piston parts.

As best shown in Figs. 2 and 3, the piston assembly comprises a piston body 27 on the end of stem or rod 16 and a cup-form packing element 28 having its base or disc portion 29 sandwiched between body 27 and a backing washer 30. Operating rod 16 has its piston end reduced in the portion 35 to form a shoulder 36, and further reduced in its extremity 38, forming the shoulder 39. The stepped rod end is received in a countersunk bore 40 provided therefor in the piston body 27, the bore being of rectangular section corresponding to the section of the rod, and providing a shoulder 42 for assembly cooperation with the rod shoulder 39 as will appear presently. Received on rod portion 35 and engaging shoulder 36 is the backing washer 30, and sandwiched between the washer and the inner end face 43 of the piston body is the base or disc portion 29 of synthetic rubber packing cup 28. The flange construction of the cup is covered in a copending application of the present inventor, Serial No. 52,007, filed September 30, 1948, and now abandoned. The cup has a central aperture 44 which closely embraces rod portion 35. A bead 45 surrounds the aperture. The depth or axial dimension of the rib bead is predetermined preferably such that when the piston parts are related, as shown in Fig. 2, wherein the bead rests on the face 43 of body 27, the rod shoulder 39 will be separated from the bore shoulder 42 by an axial distance substantially equal to the distance separating the inner face 46 of cup disc 29 from opposing face 43 of the piston body. The foregoing initial relationship of the parts is here effected so that in final assembly, the cup disc 29 over its major portion laterally of the zone containing the rib 45, will be under little if any axial compression as this will appear hereinafter.

In final assembly, the parts are urged together until the rod shoulder 39 abuts the bore shoulder 42, when the exposed portion of the rod terminal end 38 is deformed or peened-over to provide the assembly clamping head 47 in abutment with the outer face 48 of piston body 27. The parts are then in the relationship shown in Fig. 3, with the central portion only of the cup disc under appreciable axial compression, which causes the margin of aperture 44 to embrace the rod under considerable pressure, thereby producing an effective fluid seal against leakage along the rod. Packing cup disc 29 is retained between backing washer 30 and face 43 of body 27, but without any appreciable axial compression of the main portion of the disc. The latter obtains by reason of the relative axial relationship of the parts in initial assembly, as described hereinabove with reference to Fig. 2, from which it will appear now that when rod shoulder 39 is in abutment with the bore shoulder 42, face 46 of packing disc 29 is in sealing contact with the face 43 of piston body 27, bearing with little or no pressure thereagainst. Consequently, the major portion of cup disc 29 is not under axial compression, and hence is not subject to the pressure flow condition hereinbefore discussed. On the other hand, the axially compressed zone of the disc, including bead 45, is so restricted in its extent in surrounding adjacence to the rod aperture 46, that any pressure flow of the rubber material therein will produce no more than a negligible minimum of material displacement, insufficient to affect adversely, the desired fluid seal at the rod.

Figure 5:
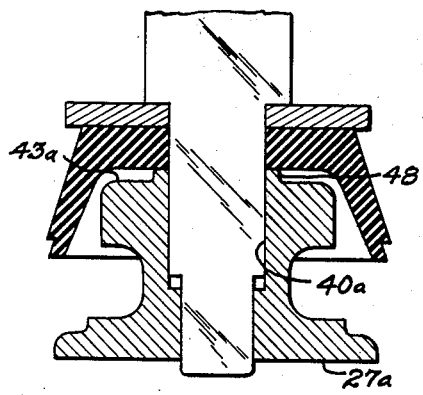
Fig. 5 is a sectional view of a piston structure, illustrating another embodiment of the invention.
Figure 6:
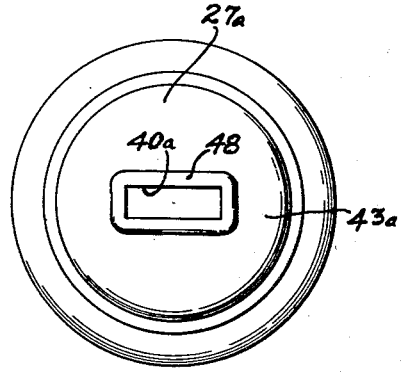
Fig. 6 is a top view of the piston body member of the piston according to Fig. 5 showing a rib surrounding the rod-receiving aperture in the body.
Figure 4:
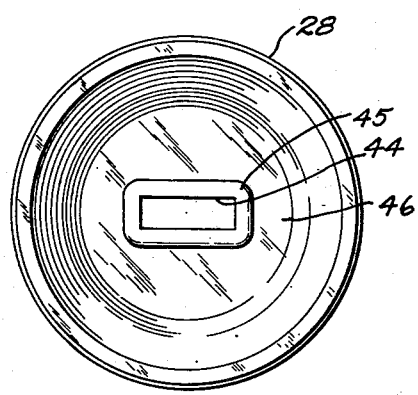
Fig. 4 is a bottom view of the packing cup employed in the piston structure of Figs. 2 and 3, showing the rod aperture and the rib about the aperture margin.

Figs. 5 and 6 illustrate a modified embodiment of the invention for attaining substantially the same result as described for the embodiment of Figs. 2 to 4. Instead of providing a bead such as 45, on the disc of the packing cup, the piston body 27a here is formed to provide, preferably as an integral part thereof, a rib or bead 48 about the margin of the body bore 40a, on the inner face 43a of the body. Thus in the initial assembly relation of the parts, rib 48 occupies the same position relative to the rod aperture margin of the packing cup disc, that the cup disc bead 48 occupies in the initial position of the parts according to Fig. 2. In all other respects, the modified embodiment may be and is shown as being the same as the first described embodiment. It will appear now that the modified piston in final assembly, has the rib 48 embedded in the disc marginal portion about the rod aperture 44a, thereby axially compressing the marginal portion to effect the desired rod seal. Of course, the bead or rib around the piston stem could be placed at the top of the rubber cup.

Having now described and illustrated several presently preferred embodiments of the present invention, it is to be understood that modifications may be made in each without departing from the spirit and full intended scope of the invention, as defined by the appended claim.

I claim:

A piston assembly comprising a piston body, a cup-form packing element of rubber or rubber-like material having an aperture in its base portion and a marginal bead immediately surrounding the same, an operating rod extending through said aperture and engaging said piston body, a backing element on said rod, and means securing said rod, said piston body, and said packing element in assembly with said body and backing element at a fixed distance apart at least approximately the thickness of said base portion so as to avoid the application of substantial compressive forces thereto, said marginal bead being compressed into the assembly to sealingly engage said rod, said backing element, and said body.

References Cited in the file of this patent

UNITED STATES PATENTS

| Number | Name | Date |
|---|---|---|
| 746,184 | Smith et al. | Dec. 8, 1903 |
| 1,333,211 | Moss | Mar. 9, 1920 |
| 1,388,254 | Hansen | Aug. 23, 1921 |
| 1,818,187 | Bailey | Aug. 11, 1931 |
| 2,211,454 | Failing et al. | Aug. 13, 1940 |
| 2,220,993 | Christenson | Nov. 12, 1940 |
| 2,277,501 | Murray | Mar. 24, 1942 |
| 2,306,838 | Volpin | Dec. 29, 1942 |
| 2,320,975 | MacClatchie | June 1, 1943 |